United States Patent [19]

Nishida et al.

[11] Patent Number: 5,384,674
[45] Date of Patent: Jan. 24, 1995

[54] IMAGE RECORDING/REPRODUCING APPARATUS WHICH DISPLAYS IMAGES TO BE SEARCHED

[75] Inventors: Syuzou Nishida; Yukihiko Haikawa; Hidenori Minoda; Ichiro Nakata, all of Higashihiroshima, Japan

[73] Assignee: Sharp Kabushiki Kaisha, Osaka, Japan

[21] Appl. No.: 831,495

[22] Filed: Feb. 5, 1992

[30] Foreign Application Priority Data

Feb. 8, 1991 [JP] Japan .................. 3-017516

[51] Int. Cl.$^6$ .............................. H04N 5/76
[52] U.S. Cl. .............................. 360/72.2; 360/48
[58] Field of Search .......... 360/72.1, 72.2, 48; 358/102, 209, 909

[56] References Cited

U.S. PATENT DOCUMENTS

| 4,229,808 | 10/1980 | Hui | 365/234 |
|---|---|---|---|
| 4,717,971 | 1/1988 | Sawyer | 360/72.1 |
| 4,763,208 | 8/1988 | Kawamura et al. | 360/33.1 |
| 4,775,969 | 10/1988 | Osterlund | 360/72.2 |
| 4,802,019 | 1/1989 | Harada et al. | 358/335 |
| 5,027,214 | 6/1991 | Fujimori | 358/209 |
| 5,027,230 | 6/1991 | Nakayama | 360/35.1 |
| 5,032,927 | 7/1991 | Watanabe et al. | 358/335 |
| 5,038,231 | 8/1991 | Harigaya et al. | 360/72.2 |
| 5,068,752 | 11/1991 | Tanaka et al. | 360/19.1 |
| 5,079,651 | 1/1992 | Tsuchida et al. | 360/72.2 |
| 5,164,831 | 11/1992 | Kuchta et al. | 358/209 X |

FOREIGN PATENT DOCUMENTS

| 0257534 | 3/1988 | European Pat. Off. |
| 1-241082 | 9/1989 | Japan . |
| 1221076 | 9/1989 | Japan . |
| 1241083 | 9/1989 | Japan . |

OTHER PUBLICATIONS

European Search Report.
Translation of European Search Report.
Partial English Translation of Japanese Patent Laid Open No. 1-241083.

Primary Examiner—Edward K. Look
Assistant Examiner—Michael S. Lee

[57] ABSTRACT

A TOC region is provided on a DAT tape. In the TOC region reduced still image data is recorded as one still image and is obtained by reducing each still picture data recorded in each of a plurality of still picture/audio composite data regions provided subsequently to the TOC region. A first address of each still picture/audio composite data is also recorded in the TOC region. At the time of reproduction, the TOC region is reproduced and the still image based on the reduced still image data is shown on a display. When an operator selects a specific still image among the plurality of displayed still pictures, the corresponding still picture/audio composite data is reproduced based on an address corresponding to the selected still picture.

18 Claims, 5 Drawing Sheets

| DICTIONARY | ILLUSTRATED BOOK OF ANIMAL | MAP |
|---|---|---|
| CAR | SHIP | BICYCLE |
| TV | RADIO | AMPLIFIER |

FIG. 6

| A | B | C |
|---|---|---|
| D | E | F |
| G | H | I |

FIG. 7

IMAGE RECORDING/REPRODUCING APPARATUS WHICH DISPLAYS IMAGES TO BE SEARCHED

BACKGROUND OF THE INVENTION

1. Field of the Invention

The present invention relates generally an to image recording/reproducing apparatus, and more particularly, to such a still picture recording/reproducing apparatus as a DAT (Digital Audio Taperecorder) for recording or reproducing numerous still picture composite data by using a magnetic tape as a recording medium.

2. Description of the Background Art

In recent years, image recording/reproducing apparatuses have been already put to practical use which record still image data obtained by an electronic still camera or a CCD (Charge Coupling Device) solid state image sensing device, by using an image recording apparatus with a magnetic disk or a magnetic tape as a recording medium. The image data can thereafter from the medium recording by using a reproducing device, thereby reproducing a still image.

As a recording medium, a 2-inch video floppy, for example, is capable of recording 25 frames of still picture data such as television images. A 5-inch optical disk is capable of recording 1600 frames of still picture data such as television images and a 120-minute DAT tape is capable of recording 2880 frames of still picture data such as television images. However, with an increase in the number of frames to be recorded, more time is required for searching for a frame. For searching for desired image data among numerous image data, it is necessary to sequentially reproduce frames one by one from the beginning until a desired image is displayed or to have a search function of finding a desired image by a search and displaying the same.

It is well known (in Japanese Patent Laying-Open No. 1-221076) that a device having a conventional search function at the time of reproduction records the contents of the entire image data recorded on a recording medium in advance on a text frame or a graphic frame, in a form equivalent to an index of a book. This enables a user to select a desired image for the search by using a pointing device (mouse) or by entering data through a keyboard, from a menu frame displaying data reduced and aggregated while reproducing the entire image data at the time of reproduction.

Searching for desired data among a plurality of image data recorded on a magnetic disk or a magnetic tape requires reproduction of the each frame as described above, and is not practical since the time necessary for the search is increased. Such a search is also impractical in that an indefinite correspondence between image data on a text frame and a graphic frame and desired image data prevents a user from reliably recognizing the desired image data.

SUMMARY OF THE INVENTION

An object of the present invention is to improve handling of an image recording/reproducing apparatus.

Another object of the present invention is to achieve a quick search of image data by an image recording/reproducing apparatus.

In order to achieve the above-described objects, an image recording/reproducing apparatus according to the present invention includes a magnetic tape having a plurality of image regions in which image data are recorded and regions for searching provided corresponding to the image regions, each of the image regions having specific identification codes; an image input circuit for sequentially inputting image data; a first recording device for recording the input image data in each of the image regions; a converter circuit for reproducing each of the recorded image data and converting the same into converted corresponding image data, a second recording device for recording each of the converted corresponding image data in each region for searching together with the identification code of the image region in which the corresponding image data is recorded; a first reproducing device for reproducing the contents recorded in the region for searching; a key input device for designating one of the reproduced corresponding image data and a second reproducing device for reproducing image data corresponding to the designated corresponding image data from the image region by using the identification code.

The thus structured image recording and reproducing apparatus reproduces image data corresponding to designated corresponding image data by using its identification code, which enables a quick search for a desired image to improve handling of the apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only, and thus are not limitative of the present invention and wherein.

DESCRIPTION OF THE PREFERRED EMBODIMENTS

Figure 1:
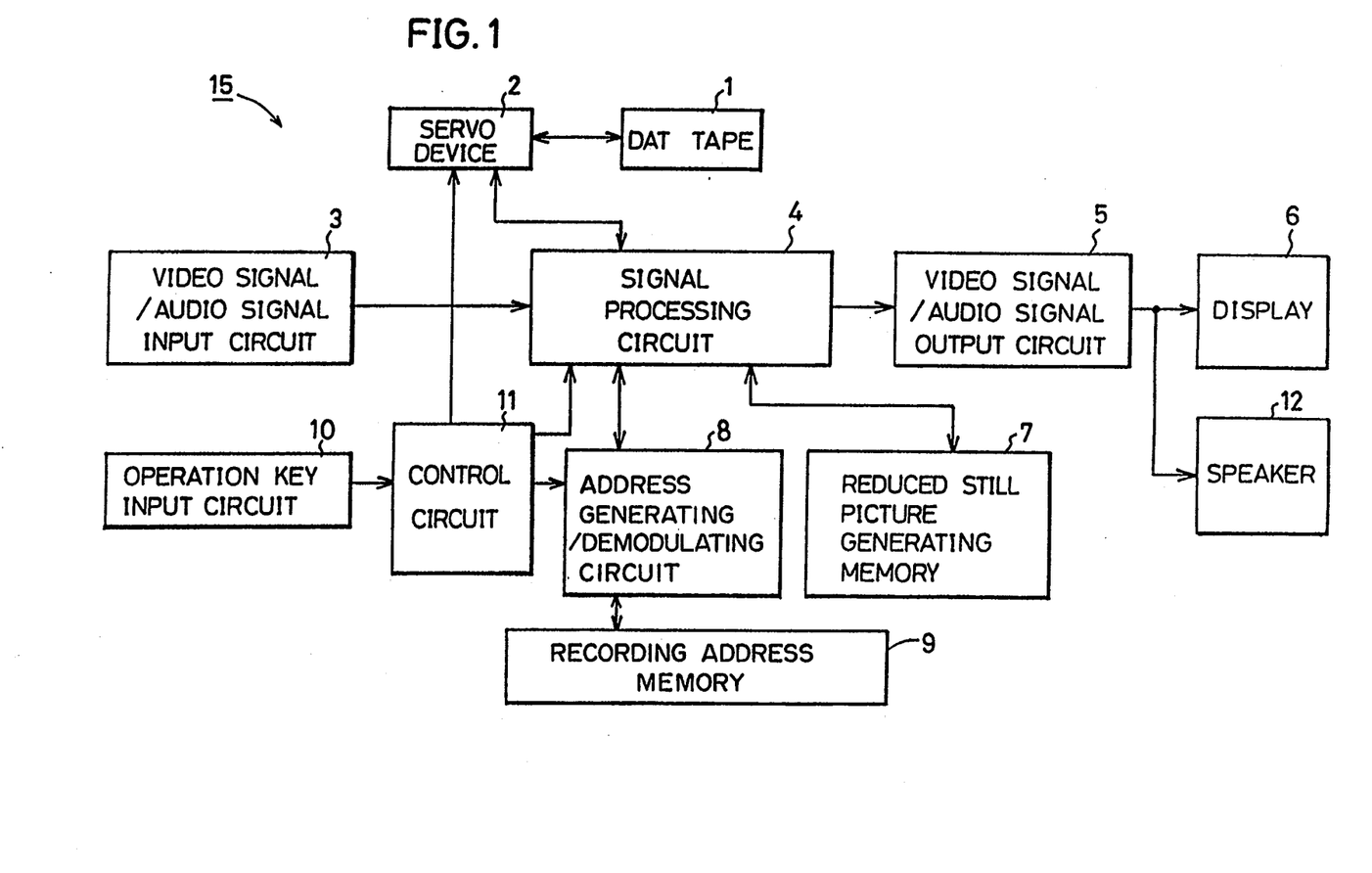
FIG. 1 is a block diagram showing a schematic structure of a still picture recording/reproducing apparatus according to one embodiment of the present invention.

FIG. 1 is a block diagram showing a schematic structure of a still picture recording/reproducing apparatus 15 according to one embodiment of the present invention. A DAT tape (magnetic tape) 1 as a recording medium is provided with a master TOC (Table of Contents) region which will be described later and a recording region including a plurality of chapters. Each chapter is provided with a reduced still picture data region called a TOC region for recording reduced/aggregated still picture data and first addresses to be recorded of a plurality of still picture/audio composite data following the TOC region, and a plurality of still picture audio composite data regions.

A servo device 2 records or reproduces on the DAT tape 1 the above-described still picture/audio composite data, reduced and aggregated still picture data and information of an address to be recorded. The servo device 2 includes a rotary drum or a travelling mechanism of a magnetic tape.

A video signal/audio signal input circuit 3 accepts a video signal and an audio signal to be recorded, converts the same into analog/digital signals and applies the converted signal to a signal processing circuit 4. The signal processing circuit 4 adds address information generated by the address generating/demodulating circuit 8 to the data input through the video signal/audio signal input circuit 3, thereby generating a signal to be recorded by the servo device 2. The signal processing circuit 4 separates data reproduced from the DAT tape 1 into video signal data, audio signal data and information of addresses to be recorded and applies the video signal data to a video signal/audio signal output circuit 5 and the reduced still picture, generating memory 7 the audio signal data to the video signal/audio signal output circuit 5 and the information of address to be recorded to the address generating/demodulating circuit 8.

A display 6 and a speaker 12 respectively displays and converts into sound an output signal converted into a digital/analog signal by the video signal/audio signal output circuit 5. The display 6 can be implemented as a liquid crystal display apparatus or a CRT, for example.

The reduced still picture generating memory 7 generates still picture data which is reduced/aggregated based on a plurality of still picture audio composite data. At this time, an address of the reduced still picture generating memory 7 is managed by the signal processing circuit 4, and still picture data of each still picture/audio composite data is thinned out and stored in the reduced still picture generating memory 7. The reduced/aggregated still picture image is read by the signal processing circuit 4 and applied to the video signal/audio signal output circuit 5. A recording address memory 9 records an address to be recorded of still picture audio composite data of each reduced still picture data when reproducing the TOC region.

An operation key input circuit 10 selects an operation mode of the still picture recording/reproducing apparatus 15, and a control circuit 11 controls each function of the still picture recording/reproducing apparatus 15 to control the servo device 2, the signal processing circuit 4 and the address generating/demodulating circuit 8 based on the output of the operation key input circuit 10.

Figure 2:
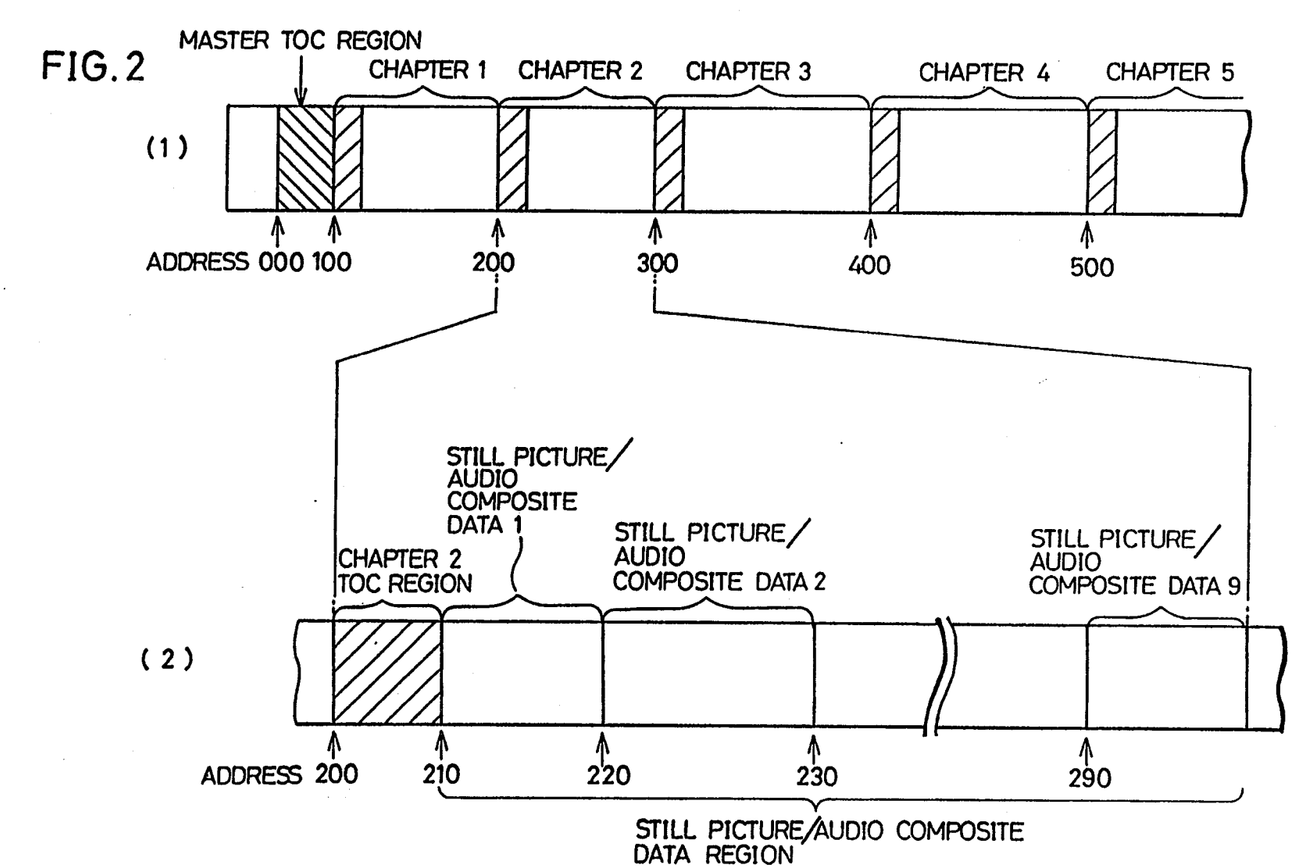
FIG. 2 is a diagram schematically showing a recording region of a DAT tape for use in the still picture recording/reproducing apparatus of FIG. 1.

FIG. 2 is a diagram schematically showing a recording region of the DAT tape 1. In FIG. 2 (1), the recording regions at addresses 000-100 are referred to as master TOC regions for recording reduced still picture data obtained by reducing and aggregating each still picture data representing each chapter recorded at addresses from 100 downward to one frame data, and information of a first address of each chapter. Blocks of recording regions at addresses from 100 downward are referred to as chapters, each chapter including a reduced still picture data region called a TOC region and a still picture/audio composite data region in which a plurality of pairs of still picture/audio composite data each including one still picture data and sound data of an arbitrary length are recorded. The TOC region records reduced still picture data obtained by reducing and aggregating still picture data in each still picture/audio composite data subsequent to the region and an address being recorded for each still picture/audio composite data.

As shown in FIG. 2 (2), for example, the TOC region extending from the addresses 200 to 210 records reduced still picture data obtained by reducing and aggregating only the still picture data out of the still picture/audio composite data recorded at the addresses 210, 220, . . . 290, and addresses 210, 220, . . . 290 to be recorded of the respective still picture/audio composite data. This is also the case with data in a recording region of the other chapters.

Figure 3:
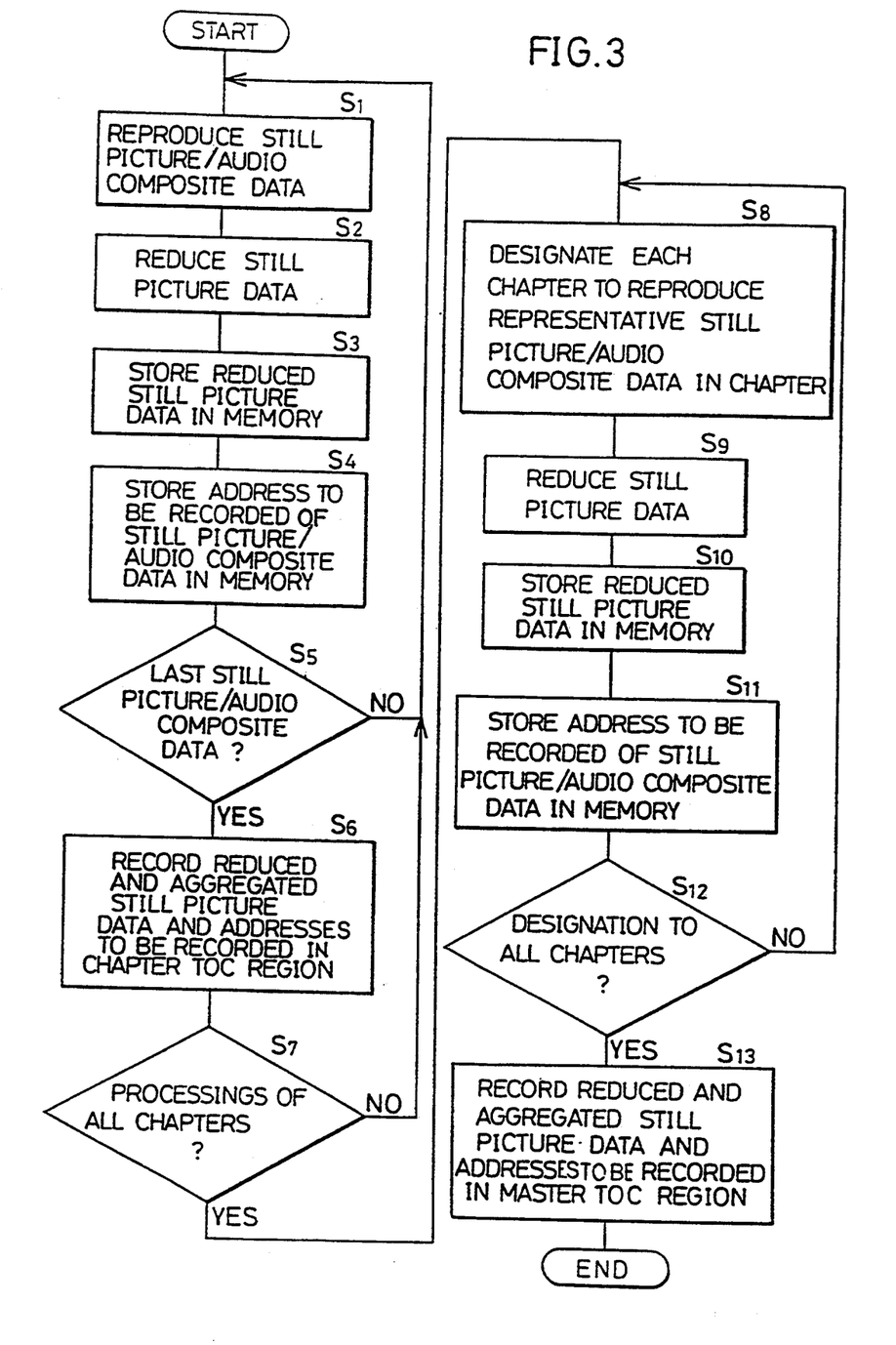
FIG. 3 is a flow chart showing an operation of forming a TOC region using the still picture recording/reproducing apparatus of FIG. 1.

FIG. 3 is a flow chart showing an operation of forming a TOC region by the still picture recording/reproducing apparatus 15. With reference to the flow chart, a schematic operation of forming the TOC region by the above-described still picture recording/reproducing apparatus 15 will be described.

First in step S1, the servo device 2 reproduces still picture audio composite data stored in a still picture audio composite data region in a chapter designated by the DAT tape 1, and each address to be recorded.

In step S2, still picture data, out of the still picture audio composite data reproduced by the servo device 2, is thinned out by the signal processing circuit 4 and converted into reduced still picture data. In step S3, the reduced still picture data is stored in the reduced still picture generating memory 7.

Then only the information of an address to be recorded is separated by the signal processing circuit 4 from the address to be recorded reproduced by the servo device 2 in step S1, the information of an address to be recorded is demodulated by the address generating/demodulating circuit 8 and then recorded in the recording address memory 9 in step S4. A series of operations in steps S1 to S4 are repeated with respect to the data recorded in a still picture audio composite data region in the designated chapter. In step S5, determination is made as to whether target still picture audio composite data is the last one in the chapter or not.

When the determination is made that the processed data is the last still picture audio composite data in the designated chapter, reduced and aggregated still picture data stored in the reduced still picture generating memory 7 and an address to be recorded of each still picture audio composite data stored in the recording address memory 9 are stored in the chapter TOC region of the DAT tape 1 by the servo device 2. Then in step S7, determination is made as to whether the processings at steps S1 to S6 have been carried out with respect to all the chapters or not. When there exists a chapter which has not yet been processed, the flow chart returns to step S1 where the same processing as described above is carried out. When the processing of all the chapters is finished, the flow proceeds to step S8 onward, to a processing of forming the master TOC region. In step S8, one chapter is designated among the plurality of chapters and representative still picture audio composite data in the chapter is reproduced. Then in the step S9, the still picture data separated from the reproduced still picture audio composite data is reduced, which data is stored in the reduced still picture generating memory 7 in step S10. Then in step S11, an address to be recorded corresponding to the still picture audio composite data reproduced in step S8 is stored in the recording address memory 9. Then in step S12, determination is made as to whether or not all the chapters have been subjected to the processings of the steps S8 to step S11. When there exists a chapter which has not been processed, the flow returns to step S8 to repeat the above-described processings.

When the processings with respect to all the chapters are finished, still picture data which represents each chapter and which is reduced and aggregated by the above-described processings, and an address to be recorded corresponding thereto are recorded in the master TOC region in step S13. The foregoing processings complete the operation of forming a chapter TOC region and a master TOC region.

Figure 4:
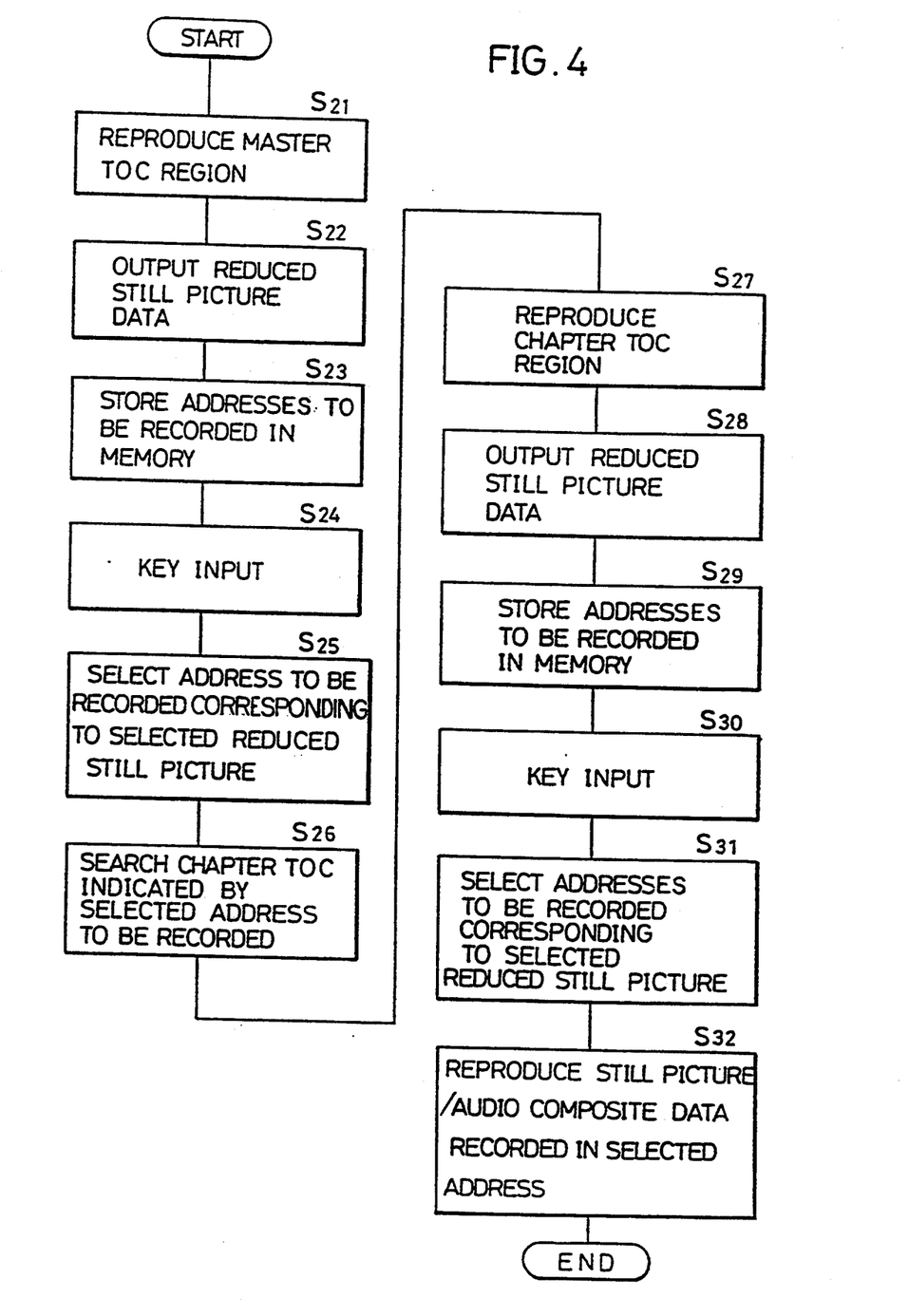
FIG. 4 is a flow chart showing a search operation of the still picture recording/reproducing apparatus of FIG. 1.
Figure 5:
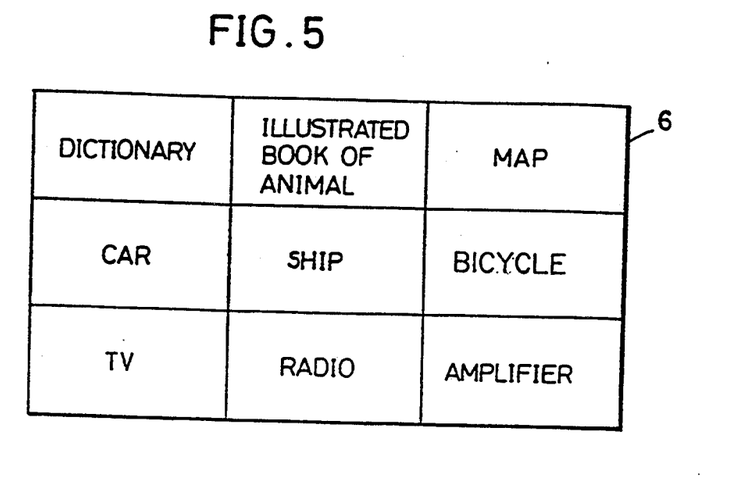
FIG. 5 is a diagram showing an example of a display based on a master TOC region displayed at the time of searching, made by the still picture recording/reproducing apparatus of FIG. 1.
Figure 6:
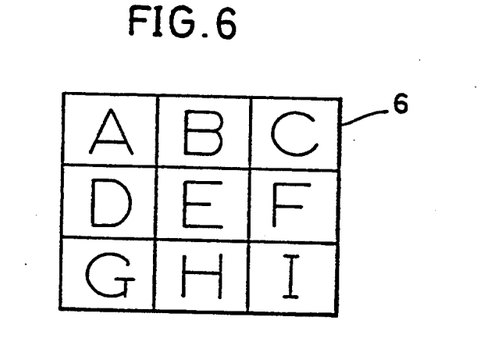
FIG. 6 is a diagram showing an example of display based on a TOC region of each chapter at the time of searching, made by the still picture recording/reproducing apparatus of FIG. 1.
Figure 7:
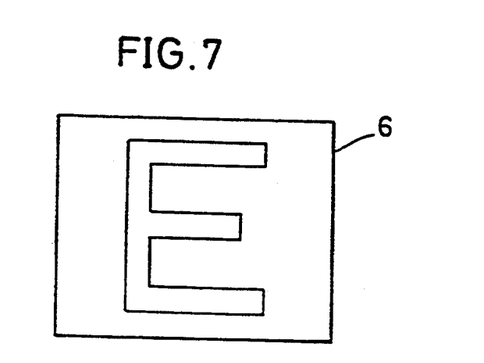
FIG. 7 is a diagram showing an example of a display made when one frame is designated among a plurality of frames in the display of FIG. 6.

FIG. 4 is a flow chart showing a search operation in the still picture recording/reproducing apparatus 15, and FIGS. 5 to 7 show examples of display 6 in a search operation. With reference to FIGS. 4 to 7, a schematic search operation in the still picture recording/reproducing apparatus 15 will be described.

First in step S21, the data of the above-described formed master TOC region is reproduced by the servo device 2. In step S22, the reduced/aggregated still picture data reproduced by the servo device 2 is converted into a digital/analog signal by the video signal/audio signal output circuit 5 and displayed on the display 6 as shown in FIG. 5. In this embodiment, still picture data corresponding to 9 chapters are stored in the master TOC region, while such 9 still pictures representing each chapter are displayed in the display 6 as "dictionary", "illustrated book of animal" and "map".

In step S23, only the information of addresses to be recorded is separated by the signal processing circuit 4 from the address to be recorded of each still picture composite data reproduced by the servo device 2, which is then demodulated by the address generating/demodulating circuit 8 and then stored in the recording address memory 9.

Then, with the reduced and aggregated still picture data displayed in the display 6 in step S22, one reduced still picture representing a chapter to be searched is selected by the operation key input circuit 10 in step S24. In step S25, an address to be recorded corresponding to the selected reduced still picture is selected among the addresses to be recorded of the still picture audio composite data stored in the recording address memory 9. Then in step S26, the chapter TOC indicated by the selected address to be recorded is searched.

In step S27, the TOC region searched by the above-described operation is reproduced by the servo device 2. In step S28, the reduced and aggregated still picture data reproduced by the servo device 2 is converted into a digital/analog signal by the video signal/audio signal output circuit 5 and displayed on the display 6 as shown in FIG. 6. In the present embodiment, with 9 still picture data recorded in one chapter, the display 6 displays 9 still pictures, that is, letters "A"–"I" in this case. Only the information of the addresses to be recorded is separated by the signal processing circuit 4 from each still picture audio composite data reproduced by the servo device 2 in step S27, demodulated by the address generating/demodulating circuit 8 for and then stored in the recording address memory 9 in step S29.

Subsequently, with the reduced and aggregated still picture being displayed on the display 6 in step S28, when a reduced still picture is selected by the operation key input circuit 10 in step S30, an address to be recorded of the still picture/audio composite data corresponding to the selected reduced still picture is selected in the subsequent step S31 among the addresses to be recorded of the still picture audio composite data stored in the recording address memory 9 in the above-described step S29. Subsequently in step S32, the still picture/audio composite data recorded at the address to be recorded of the still picture audio composite data selected by the servo device 2 in step S31, that is, the still picture/audio composite data to be searched is reproduced and separated into still picture data and audio data by the signal processing circuit 4, which data are applied to the video signal/audio signal output circuit 5. The video signal/audio signal output circuit 5 converts the applied still picture data and audio data into digital/analog signals, respectively, to output the same as a still picture video signal and an audio signal. As a result, a still picture (for example, letter "E") is displayed on the display 6 as shown in FIG. 7 and the audio signal is converted into sound by the speaker 12. The above-described operations complete the search operation in the still picture recording/reproducing apparatus 15.

As described above, the present embodiment reduces time required for search, since a TOC region is provided on the DAT tape 1, which region records reduced and aggregated still picture data and an address to be recorded of the still picture/audio composite data from which the reduced still picture data is separated, in order to record in advance the above-described reduced still picture data and an address to be recorded. In addition, a still picture to be recorded in the TOC region is obtained by reducing a still picture within the search range, which enables a user to relate a reduced still picture to still picture/audio composite data to be searched at the time of searching.

In addition, the DAT tape 1 is not limited to a magnetic tape but can also employ such recording media as a floppy disk and an optical disk.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording/reproducing apparatus comprising:
a recording medium including a plurality each having an identification code, of image regions for recording image data and a plurality of search regions provided corresponding to said image regions;
image inputting means for sequentially inputting image data;
first recording means for recording said input image data respectively into each of said image regions;

converting means for reproducing and converting each of said recorded image data into corresponding converted image data;

second recording means for recording in said search regions each of said converted image data, together with each identification code of an image region in which each of the corresponding image data is recorded;

first reproducing means for reproducing said converted image data and said identification codes stored in said search regions;

designating means for designating one of said reproduced converted image data; and second reproducing means, coupled to said designating means, for reproducing corresponding image data of said designated converted image data from said image regions in accordance with said reproduced identification codes.

2. The image recording/reproducing apparatus according to claim 1, wherein said image data includes still picture data and audio data.

3. The image recording/reproducing apparatus according to claim 2, wherein said converting means generates said corresponding image data by reducing said reproduced image data into still picture 4. The image recording/reproducing apparatus according to claim 1, wherein said recording medium includes a plurality of chapters, each chapter including one of said plurality of image regions and one of said plurality of search regions corresponding thereto.

5. The image recording/reproducing apparatus according to claim 4, wherein said recording medium includes a representative region formed for searching said plurality of search regions for said plurality of chapters.

6. The image recording/reproducing apparatus according to claim 1, wherein said recording medium comprises magnetic tape.

7. A recording medium for use in an image recording-/reproducing apparatus comprising:

a plurality of data storing regions each for storing image data; and a search region for storing converted image data corresponding to each of said recorded image data and identification codes of said data storing regions in which each of said recorded image data is recorded.

8. The recording medium according to claim 7, comprising a plurality of search regions, the recording medium further having a plurality of chapters each including one of said data storage regions and one of said search regions and having a representative region formed for searching the plurality of search regions of each of said chapters.

9. The recording medium according to claim 7, comprising magnetic tape.

10. An image recording apparatus for recording images on a recording medium comprising:

image inputting means for sequentially inputting image data;

first recording means for recording said input image data respectively into each of a plurality of image regions of said recording medium;

converting means for reproducing and converting each of said recorded image data into corresponding converted image data; and second recording means for recording in search regions of said recording medium each of said converted image data, together with an identification code of an image region of said recording medium in which each of the corresponding image data is recorded.

11. The image recording apparatus according to claim 10, wherein said image data includes still picture data and audio data.

12. The image recording apparatus according to claim 11, wherein said converting means reduces said reproduced image data to generate said converted image data.

13. An image reproducing apparatus for reproducing image data from a recording medium having a plurality of image regions where image data is recorded and a plurality of search regions provided corresponding to said plurality of image regions, wherein converted image data corresponding to the image data recorded in each of said plurality of image regions is recorded, the image reproducing apparatus comprising:

first reproducing means for reproducing said converted image data recorded in said plurality of search regions of said recording medium so as to form converted images;

designating means for designating one of said converted images; and second reproducing means, coupled to said designating means, for reproducing image data corresponding to said designated converted image data from said plurality of image regions of said recording medium;

wherein each of said plurality of image regions of said recording medium has an identification code and each of said plurality of search regions includes converted image data of an the image region and the identification code of an image region where image data corresponding to each converted image data, is recorded; and said reproducing means reproducing image data based on the identification code recorded with the converted image data of said designated converted image.

14. An image recording/reproducing apparatus comprising:

a recording medium for storing recorded image data;

recording means for recording on said recording medium a plurality of still picture/audio composite data regions, in each of which still picture audio composite data including still picture data and audio data are recorded, and a plurality of still picture data regions including still picture data for searching, said still picture data including reduced still picture data obtained by reducing only each still picture data of each still picture/audio composite data, and an address in which each still picture/audio composite data is recorded;

reproducing means for reproducing the still picture/audio composite data and the still picture data for searching from said recording medium;

still picture data reducing/aggregating means for reducing each still picture data recorded in the plurality of still picture/audio composite data regions to generate reduced still picture data;

selecting means for selecting still picture/audio composite data to be reproduced in accordance with the still picture data for searching; and outputting means for outputting still picture/audio composite data and still picture data for searching in accordance with the output of said reproducing means, wherein at the time of recording, a plurality of still picture/audio composite data are sequentially recorded and reduced still picture data generated by said still picture data reducing/aggregating aggregating means is recorded as still picture data for searching, and at the time of reproduction, when still picture data for searching is first reproduced and still picture/audio composite data to be reproduced is selected by said selecting means, the still picture/audio composite data is reproduced based on the corresponding address.

15. An image recording/reproducing apparatus comprising:

input means for inputting image data and audio data;

recording means for recording the image data and the audio data into image regions of a recording medium;

conversion means for reducing and aggregating the image data into converted image data, said recording means recording the converted image data and image region addresses of the corresponding recorded image data into search regions of the recording medium;

reproducing means for reproducing the image data during a playback mode and the converted image data during a search mode; and designating means for designating a selected one of the image data from the converted image data reproduced during the search mode, the selected one of the image data thereafter being reproduced by said reproducing means during the playback mode with the audio data in accordance with the corresponding recorded image region address.

16. The image recording/reproducing apparatus of claim 15, wherein said conversion means generates converted image data for each image region and said recording means records the converted image data and the image region addresses for each image region in a respective search region, said conversion means reducing and aggregating the converted image data of each respective search region into master data and said recording means recording the master data and search region addresses into a master table of contents region of the recording medium.

17. The image recording/reproducing apparatus of claim 15, wherein said image data comprises still picture data.

18. The image recording/reproducing apparatus of claim 15, wherein the recording medium comprises magnetic tape.

* * * * *